(12) United States Patent
Fatemi et al.

(10) Patent No.: US 10,528,391 B1
(45) Date of Patent: Jan. 7, 2020

(54) EXECUTION MANAGER FOR BINARY OBJECTS OPERATING ACROSS PRIVATE ADDRESS SPACES

(71) Applicant: TIBCO Software Inc., Palo Alto, CA (US)

(72) Inventors: Reza Fatemi, Mission Viejo, CA (US); John Driver, Sunnyvale, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 19 days.

(21) Appl. No.: 15/582,336

(22) Filed: Apr. 28, 2017

Related U.S. Application Data

(60) Provisional application No. 62/338,702, filed on May 19, 2016.

(51) Int. Cl.
*G06F 9/50* (2006.01)
*G06F 3/06* (2006.01)
*G06F 9/445* (2018.01)
*G06F 9/448* (2018.01)

(52) U.S. Cl.
CPC ............ *G06F 9/5016* (2013.01); *G06F 3/064* (2013.01); *G06F 3/0622* (2013.01); *G06F 3/0659* (2013.01); *G06F 3/0673* (2013.01); *G06F 9/445* (2013.01); *G06F 9/448* (2018.02)

(58) Field of Classification Search
CPC .................................................... G06F 9/5016
See application file for complete search history.

(56) References Cited

U.S. PATENT DOCUMENTS

2017/0083724 A1* 3/2017 Chhabra ................. G06F 21/72

OTHER PUBLICATIONS

High Availability and Scalability of Mainframe Environments using System z and z/OS as example, 2013, Kit Scientific Publishing (Year: 2013).*

* cited by examiner

*Primary Examiner* — Charlie Sun
(74) *Attorney, Agent, or Firm* — McGuireWoods LLP

(57) ABSTRACT

Techniques are disclosed to operate binary objects across private address spaces. In various embodiments, a shared memory segment is allocated for two address spaces, the first comprising a home address space and the second comprising a target address space. One or more executable modules are loaded in the home address space. One or more program call routines and an environment to schedule system request blocks (SRB) are built in the home address space. The environment to schedule system request blocks is configured to be used to schedule an SRB into the target address space, the SRB comprising information configured to cause the target address space to cause an associated one of the executable modules to execute.

14 Claims, 7 Drawing Sheets

EXECUTION MANAGER FOR BINARY OBJECTS OPERATING ACROSS PRIVATE ADDRESS SPACES

CROSS REFERENCE TO OTHER APPLICATIONS

This application claims priority to U.S. Provisional Patent Application No. 62/338,702 entitled EXECUTION MANAGER FOR BINARY OBJECTS OPERATING ACROSS PRIVATE ADDRESS SPACES, filed May 19, 2016, which is incorporated herein by reference for all purposes.

BACKGROUND OF THE INVENTION

For most operating systems, applications running on the operating system typically operate most in isolation from each other. An operating system may provide a mechanism for applications to exchange information, but typically such mechanisms are subject to a number of restrictions and limitations.

For example, z/OS is an operating system for IBM® mainframes, produced by IBM. The range of virtual addresses that the z/OS operating system assigns to a user or separately running program is called an "address space". Each "address space" comprises an area of contiguous virtual addresses available to a program to execute instructions and store data. The use of address spaces allows z/OS to maintain the distinction between the programs and data belonging to each address space. By design, the private areas in one user's address space are intended to be isolated from the private areas in other address spaces. Each address space also contains a common area that is accessible to every other address space. Typically, an application stores its data in the private area of its address space.

Applications running in isolation may compete with each other for resources, such as the use of specialty CPU engines or other hardware and/or software resources of the system. Shared, concurrent access to objects, such as files, may not be provided by the operating system alone.

BRIEF DESCRIPTION OF THE DRAWINGS

Various embodiments of the invention are disclosed in the following detailed description and the accompanying drawings.

DETAILED DESCRIPTION

Figure 1:
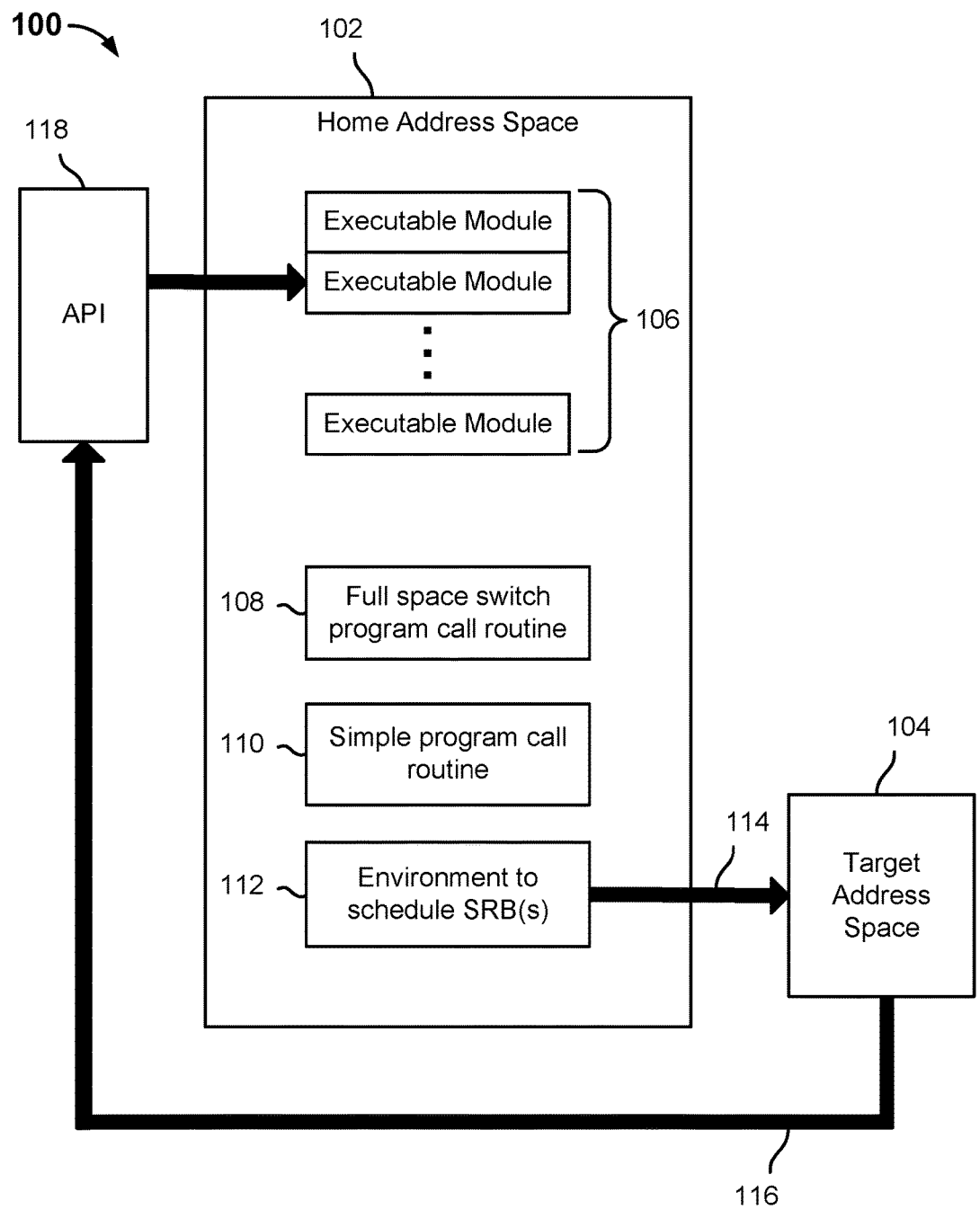
FIG. 1 is a block diagram illustrating an embodiment of a system to operate binary objects across private address spaces.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to enable binary objects to operate across private address spaces are disclosed. In various embodiments, the limitations of cross-system and/or cross-memory facilities provided by an underlying operating system may be avoided at least in part by providing binary objects, e.g., functions, that operate in a "home" or "owning" address space portion of a shared memory segment. A Service Request Block (SRB) or equivalent is scheduled in a target address space portion of the shared memory segment, such as a target address space associated with a user application. The target address space is prompted to invoke (e.g., via an API or other service call) an executable module (e.g., function) that has been loaded into the home address space. In various embodiments, the SRB causes other work in the target address space to be suspended until an indication is received that the executable module (e.g., function) has finished. In various embodiments, the SRB causes an IRB (asynchronous exit to be scheduled) in the target address space until an indication is received that the executable module (e.g., function) has finished.

In various embodiments, the solution provides a generalized solution for all users of the resident binary modules to recover from abnormal terminations to ensure integrity of their executions with respect to user data and assets.

In various embodiments, techniques disclosed herein may be used to do one or more of the following:

Creates enclaves for applications to utilize operating system-provided resources, such as IBM mainframe specialty engines.

Provides a process that manages virtual storage and storage protection from unwanted users.

Provides the capability to throttle the percentage of workload being routed to limited operating system resources, such as the specialty engines.

Provides protection against abnormal termination of user code in unwanted address space modes.

Provides asynchronous or synchronous processing for the application requests depending on the request type.

Grants any high level language binary module the ability to execute in a target or system address space as a part of that address space.

In some embodiments, techniques disclosed herein are used to provide the ability to operate binary objects across private address spaces in a mainframe computing environment, such as an IBM mainframe computer. The "Z Series Operating System" or "z/OS" is an operating system for IBM mainframes. The range of virtual addresses that the z/OS operating system assigns to a user or separately running program is called an "address space". Each "address space" comprises an area of contiguous virtual addresses available to a program to execute instructions and store data. The use of address spaces allows z/OS to maintain the distinction between the programs and data belonging to each address space. By design, the private areas in one user's address space are intended to be isolated from the private areas in other address spaces. Each address space also contains a common area that is accessible to every other address space.

In z/OS, units of work are represented by two kinds of control blocks: Task Control Blocks (TCBs) and Service Request Blocks (SRBs). TCBs represent tasks executing within an address space, such as user programs and system programs that support the user programs. An SRB represents a request to execute a system service routine. SRBs provide a mechanism for communication between address spaces. Only programs running in a mode of higher authority called "supervisor state" can create an SRB. A program with "supervisor state" authority may use an SRB to initiate a process in another address space or in the same address space. The SRB is asynchronous in nature and runs independently of the program that issues it.

A program having supervisor state authority obtains storage and initializes the SRB with things such as the identity of the target address space and pointers to the code that will process the request. The program creating the SRB then issues ("schedules") the SRB and indicates whether the SRB has global (system-wide) or local (address space-wide) priority. SRBs with a global priority have a higher priority than that of any address space, regardless of the actual address space in which they will be executed. SRBs with a local priority have a priority equal to that of the address space in which they will be executed, but higher than any TCB within that address space.

FIG. 1 is a block diagram illustrating an embodiment of a system to operate binary objects across private address spaces. In the example shown, the system 100 includes a shared memory segment that has been allocated by a master task for two address spaces, one being a home (owning) address space 102 and the other being the target (user application) address space 104. In a shared memory area of the home address space 102, executable modules 106 have been loaded and a full space switch program call routine 108, a simple program call routine 110, and an environment for initializing and scheduling SRB(s) 112 have been built. This now allows the executable modules 106 to be available in both the home and target address space. In various embodiments, full space switch program call routine 108 and simple program call routine 110 are used for the purpose of communication across address spaces, such as from the home address space to a target address space, from a primary address space to a second address space, etc.

In various embodiments, an SRB is scheduled by the home address space using standard services provided for authorized programs that may be invoked to schedule SRBs 114 in a target address space 104. The IRB causes the target address space to suspend other work while an API call 116, directed to a service identified in or otherwise associated with the SRB, is directed to API 118, which in turn invokes a binary object's specific executable module 106, with which the SRB 114 and API call 116 are associated. The binary object executes until done, at which time a completion message or other indication of completion is sent to the target address space 104, prompting the target address space to resume other work.

Using techniques disclosed herein, a single instance of a binary object may be shared by multiple applications/users, each associated with its own private address space. By contrast, in systems in which shared libraries such as a DLL are used, each user/application would create an instance of an object in its own private space, for its own use, in isolation from other instances, resulting in consumption of space and computing resources by each such instance.

Figure 2:
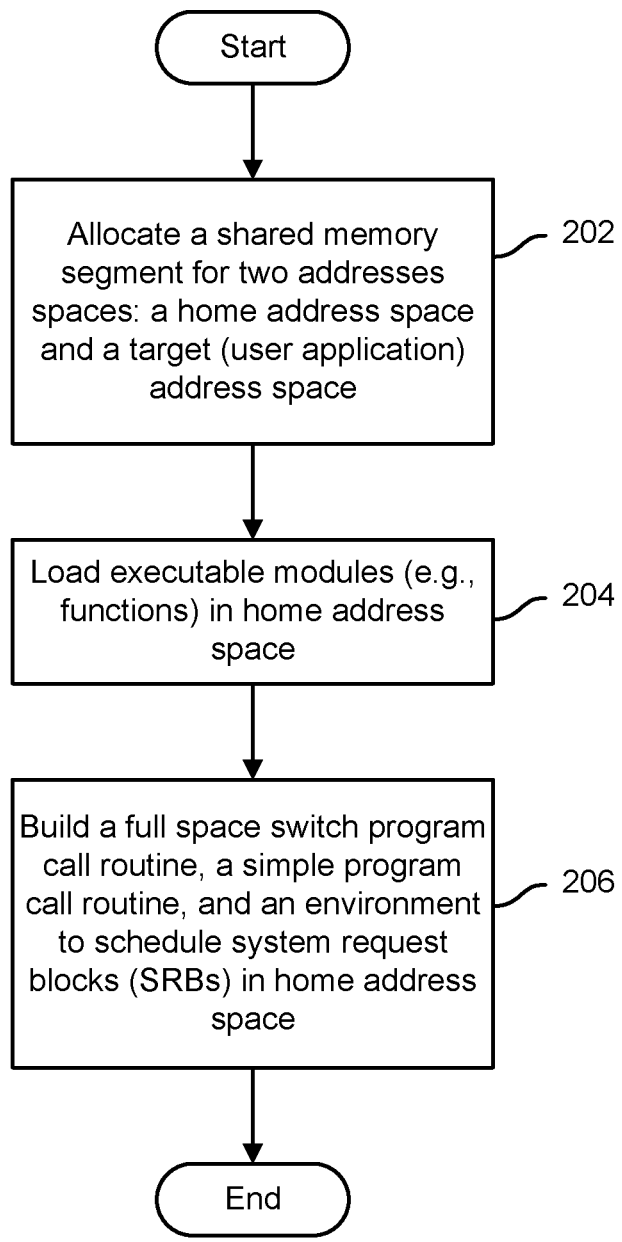
FIG. 2 is a flow diagram illustrating an embodiment of a process to configure a system to operate binary objects across private address spaces.

FIG. 2 is a flow diagram illustrating an embodiment of a process to configure a system to operate binary objects across private address spaces. In some embodiments, the process of FIG. 2 may be used to set up the system and environment 100 of FIG. 1. In the example shown, a shared memory segment is allocated for two address spaces: a home address space and a target (e.g., user application) address space (202). Executable modules (e.g., functions) are loaded into the home address space (204). A full space switch program call routine, a simple program call routine, and an environment to schedule system request blocks (SRBs) are built in the home address space (206).

Figure 3:
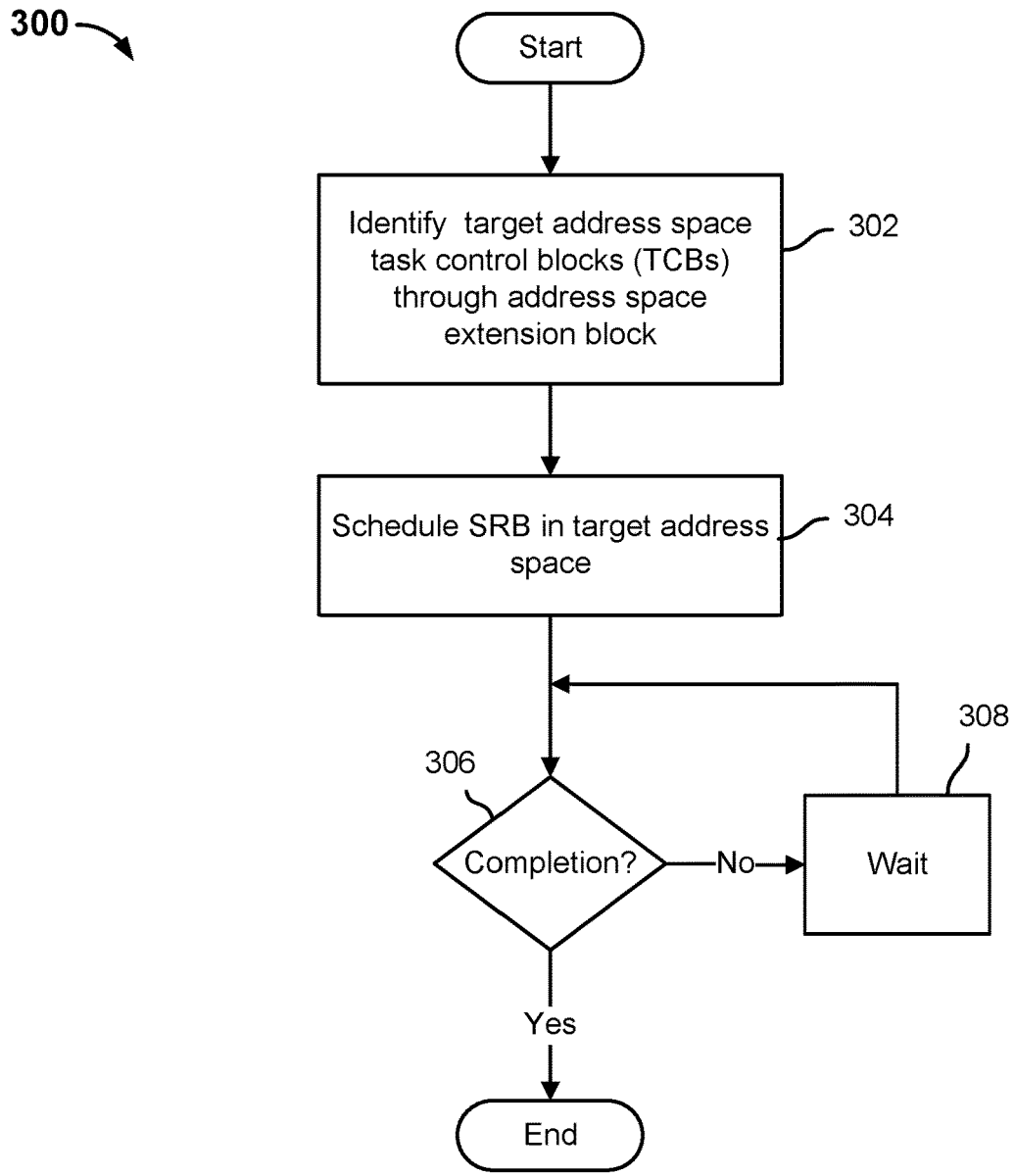
FIG. 3 is a flow diagram illustrating an embodiment of a process to operate binary objects across private address spaces.

FIG. 3 is a flow diagram illustrating an embodiment of a process to operate binary objects across private address spaces. In some embodiments, a home ("owning") address space such as home address space 102 of FIG. 1 may perform the process 300 of FIG. 3. In the example shown, one or more task control blocks (TCBs) of a target address space are identified though the address space extension block (302). In various embodiments, a target address space may have many subtasks (TCBs) that perform asynchronous work on behalf of that address space. In some embodiments, the list of subtasks (e.g., address of all TCB's) may be kept in a chain in an address space extension block. To target a particular TCB, the address of the TCB that the SRB would get scheduled in is found. In some embodiments, this is done by obtaining the TCB chain address from the address space extension block. An SRB is scheduled in the target address space (304). Until the binary object (e.g., function) associated with the SRB has been invoked and has executed to completion (306), the process waits (308). Once any function within the process indicates that the invoked function has completed execution (306) the process of FIG. 3 ends.

Figure 4:
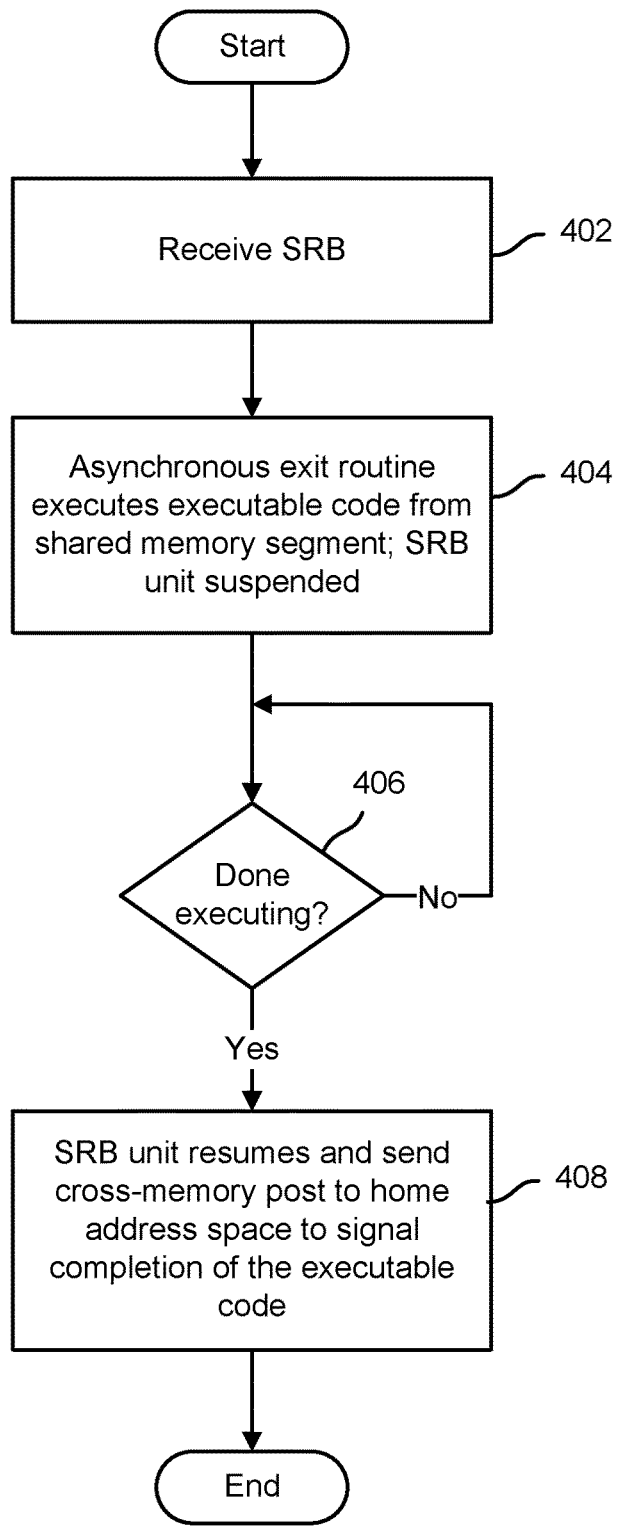
FIG. 4 is a flow diagram illustrating an embodiment of a process to operate binary objects across private address spaces.

FIG. 4 is a flow diagram illustrating an embodiment of a process to operate binary objects across private address spaces. In some embodiments, a target address space such as target address space 104 of FIG. 1 may perform the process of FIG. 4. In the example shown, an SRB originating from the home address space is received (402). An IRB asynchronous exit routine executes executable code from the shared memory segment (e.g., the home address space), and the SRB unit of the target address space is suspended (404). This allows full interrupts in a cross-memory environment without any cross-memory environment restrictions. The process waits until the executable code is done executing (406), e.g., until a completion indication is received, after which the SRB unit of the target address space resumes and a cross-memory post is sent to the home address space to signal completion of the executable code (408). At this point the target address space continues its execution until it requires this environment again.

Figure 5:
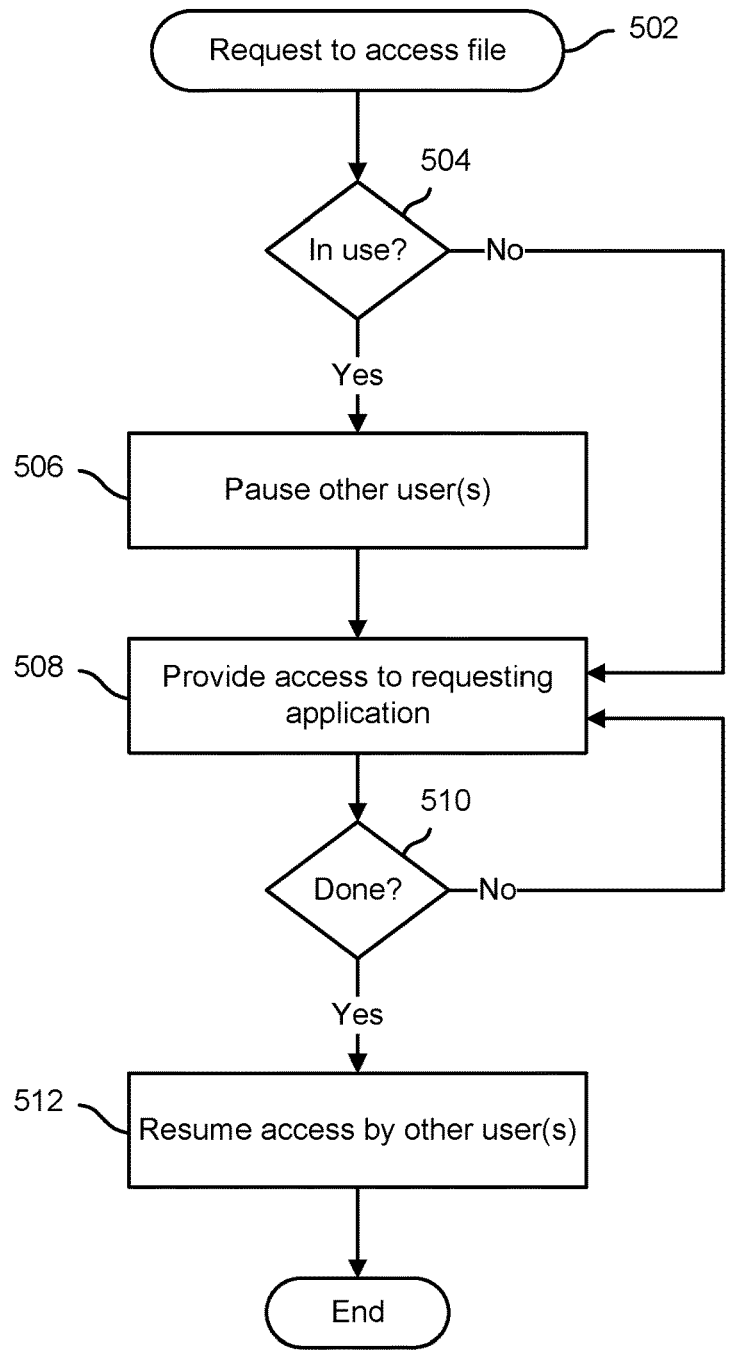
FIG. 5 is a flow diagram illustrating an embodiment of a process to use an ability to operate binary objects across private address spaces to provide shared access to a file.

FIG. 5 is a flow diagram illustrating an embodiment of a process to use an ability to operate binary objects across private address spaces to provide shared access to a file. In some embodiments, the process of FIG. 5 may be performed by a home address space, such as home address space 102 of FIG. 1, and/or an associated entity or process, such as an execution manager. In the example shown, a request to access a file is received (502). If the file is in use (504), e.g., by another user/application associated with another private address space, the use by the other user is paused (506) and access to the same copy in memory is provided to the requesting application (508) until an indication is received that the requesting application is done (510), and with time access by the other user(s) may resume (512). If the file is not in use (504), the file is read into memory and access is provided until done (508, 510). In some embodiments, the process of FIG. 5 may be used to provide access to a live copy of a file, e.g., for purposes of backup, while maintaining nearly continuous availability of the file to one or more other users (e.g., applications).

Figure 6:
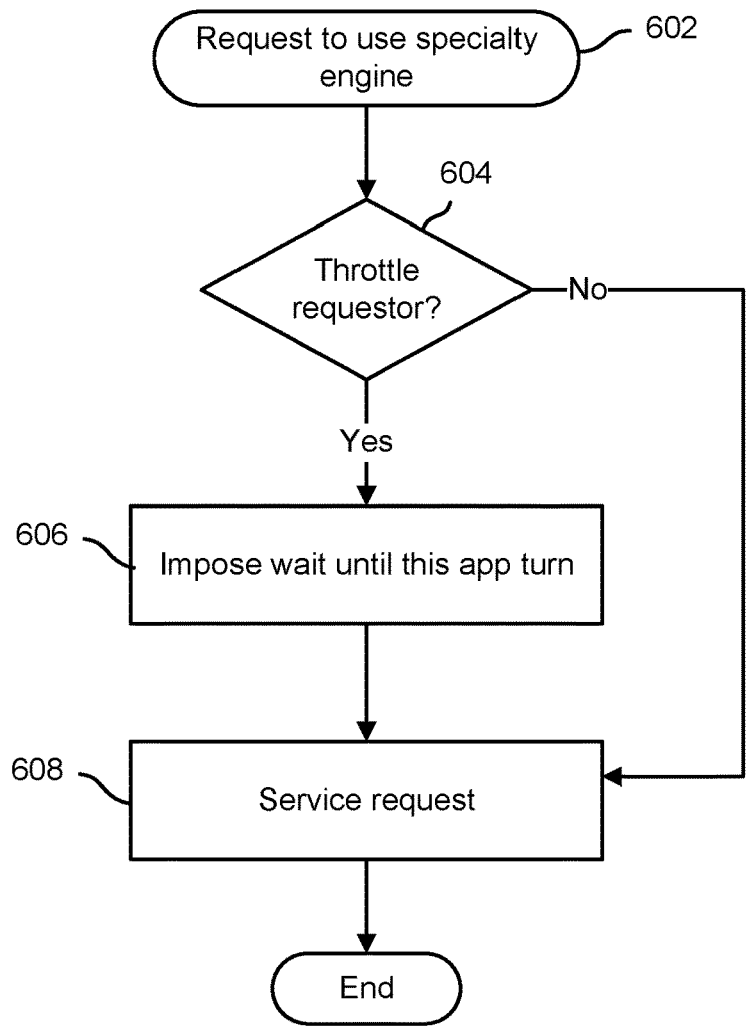
FIG. 6 is a flow diagram illustrating an embodiment of a process to use an ability to operate binary objects across private address spaces to manage access to a shared resource, such as a mainframe computer specialty engine.

FIG. 6 is a flow diagram illustrating an embodiment of a process to use an ability to operate binary objects across private address spaces to manage access to a shared resource, such as a mainframe computer specialty engine. In various embodiments, the process of FIG. 6 may be performed by a home address space and/or an associated entity. Applications associated with target address spaces may be configured to access specialty engines (or other resources) via the home address space. A request to use a specialty engine is received (602). If the request would result in the requesting user/application exceeding its allocated bandwidth of the specialty engine (604), the requesting user/application is required to wait (606) until it is once again its turn (e.g., within its allocated bandwidth) to use the specialty engine (606), at which time the request is serviced (608). If the requesting user/application has not exceeded its allocation (604), the request is serviced without delay (608).

Figure 7:
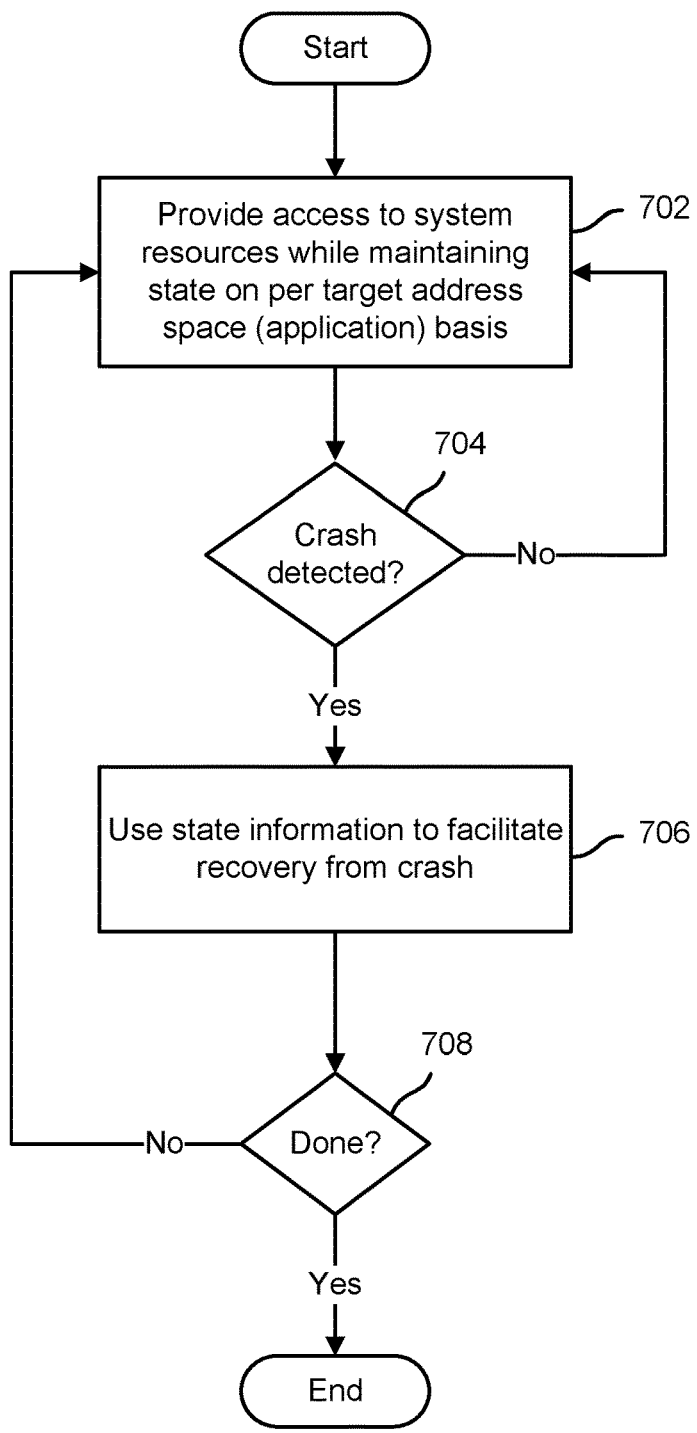
FIG. 7 is a flow diagram illustrating an embodiment of a process to use an ability to operate binary objects across private address spaces to facilitate crash recovery.

FIG. 7 is a flow diagram illustrating an embodiment of a process to use an ability to operate binary objects across private address spaces to facilitate crash recovery. In various embodiments, the process of FIG. 7 may be performed by a home address space and/or an associated entity. In the example shown, access to system resources is provided while maintaining state, e.g., at the home address space, on a per target address space (i.e., per user/application) basis (702). If a crash is detected (704), e.g., a user application associated with a given private address space crashes, the state information associated with the affected private address space is used to facilitate recovery from the crash (706). The process continues until done (708), e.g., the system is shut down.

In various embodiments, techniques disclosed herein may be used to provide users a platform where an interface using any high level language may execute in any address space local or foreign on behalf of the target address space. For example, a file can be closed or opened in the executing address space from any environment that does not provide this interface.

In various embodiments, execution in an address space on a remote address space is enabled. In some embodiments, to send shared memory data from one address space to another address space the z/OS execution manager protects and sends the memory data on behalf of the user application.

The solution, in various embodiments, optimizes memory between multiple address spaces using Shared Memory segments that minimize any storage to storage movement, providing for faster data transfer between address spaces. In various embodiments, techniques disclosed herein may be used in any environment that does not allow any type of interrupt.

An interrupt is an event that alters the sequence in which the processor executes instructions. An interrupt might be planned (specifically requested by the currently running program) or unplanned (caused by an event that may or may not be related to the currently running program). Six types of interrupts are currently used by z/OS, as follows:

Supervisor calls or SVC interrupts
    These interrupts occur when the program issues an SVC to request a particular system service. An SVC interrupts the program being executed and passes control to the supervisor so that it can perform the service. Programs request these services through macros such as OPEN (open a file), GETMAIN (obtain storage), or WTO (write a message to the system operator).

I/O interrupts
    These interrupts occur when the channel subsystem signals a change of status, such as an input/output (I/O) operation completing, an error occurring, or an I/O device such as a printer has become ready for work.

External interrupts
    These interrupts can indicate any of several events, such as a time interval expiring, the operator pressing the interrupt key on the console, or the processor receiving a signal from another processor.

Restart interrupts
    These interrupts occur when the operator selects the restart function at the console or when a restart SIGP (signal processor) instruction is received from another processor.

Program interrupts
    These interrupts are caused by program errors (for example, the program attempts to perform an invalid operation), page faults (the program references a page that is not in central storage), or requests to monitor an event.

Machine check interrupts
    These interrupts are caused by machine malfunctions.
    When an interrupt occurs, the hardware saves pertinent information about the program that was interrupted and, if possible, disables the processor for further interrupts of the same type. The hardware then routes control to the appropriate interrupt handler routine. The program status word or PSW is a key resource in this process.

The program status word (PSW) is a 128-bit data area in the processor that, along with a variety of other types of registers (control registers, timing registers, and prefix registers) provides details crucial to both the hardware and the software. The current PSW includes the address of the next program instruction and control information about the program that is running. Each processor has only one current PSW. Thus, only one task can execute on a processor at a time.

The PSW controls the order in which instructions are fed to the processor, and indicates the status of the system in relation to the currently running program. Although each processor has only one PSW, it is useful to think of three states of PSWs to understand interrupt processing:

Current PSW
New PSW
Old PSW

The current PSW indicates the next instruction to be executed. It also indicates whether the processor is enabled or disabled for I/O interrupts, external interrupts, machine check interrupts, and certain program interrupts. When the processor is enabled, these interrupts can occur. When the processor is disabled, these interrupts are ignored or remain pending.

There is a new PSW and an old PSW associated with each of the six types of interrupts. The new PSW contains the address of the routine that can process its associated interrupt. If the processor is enabled for interrupts when an interrupt occurs, PSWs are switched using the following technique:

Storing the current PSW in the old PSW associated with the type of interrupt that occurred.

Loading the contents of the new PSW for the type of interrupt that occurred into the current PSW.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory; and
   a processor coupled to the memory and configured to:
   allocate a shared memory segment of the memory for two address spaces, the first comprising a home address space and the second comprising a target address space;
   load one or more executable modules in the home address space; and
   build in the home address space one or more program call routines and an environment to schedule system request blocks;
   wherein the environment to schedule system request blocks is configured to be used to schedule an SRB into the target address space, the SRB comprising information configured to cause the target address space to cause an associated one or more of the executable modules to execute;
   wherein the target address space is configured to execute the executable module from the shared memory segment;
   wherein the target address space uses an asynchronous exit routine to execute the executable module;
   wherein a cross-memory post is sent by the target address space to the home address to signal completion of the executable module.

2. The system of claim 1, wherein the processor is further configured to identify a task control block (TCB) associated with the target address space.

3. The system of claim 1, wherein an SRB unit of the target address space resumes upon completion of the executable module.

4. The system of claim 1, wherein the executable module comprises a function.

5. The system of claim 1, wherein the executable module provides shared access to a file or other stored object.

6. The system of claim 1, wherein the executable module provides managed access to a specialty engine.

7. The system of claim 1, wherein the target address space executes the executable code via an API or other service call.

8. A method, comprising:
   allocating a shared memory segment of a memory for two address spaces, the first comprising a home address space and the second comprising a target address space;
   loading one or more executable modules in the home address space; and
   building in the home address space one or more program call routines and an environment to schedule system request blocks;
   wherein the environment to schedule system request blocks is configured to be used to schedule an SRB into the target address space, the SRB comprising information configured to cause the target address space to cause an associated one or more of the executable modules to execute;
   wherein the target address space is configured to execute the executable module from the shared memory segment;
   wherein the target address space uses an asynchronous exit routine to execute the executable module;
   wherein a cross-memory post is sent by the target address space to the home address to signal completion of the executable module.

9. The method of claim 8, further comprising identifying a task control block (TCB) associated with the target address space.

10. The method of claim 8, wherein an SRB unit of the target address space resumes upon completion of the executable module.

11. The method of claim 8, wherein the executable module comprises a function.

12. The method of claim 8, wherein the executable module provides shared access to a file or other stored object.

13. The method of claim 8, wherein the executable module provides managed access to a specialty engine.

14. A computer program product embodied in a non-transitory computer readable medium and comprising computer instructions for:
   allocating a shared memory segment of a memory for two address spaces, the first comprising a home address space and the second comprising a target address space;
   loading one or more executable modules in the home address space; and
   building in the home address space one or more program call routines and an environment to schedule system request blocks;
   wherein the environment to schedule system request blocks is configured to be used to schedule an SRB into the target address space, the SRB comprising information configured to cause the target address space to cause an associated one or more of the executable modules to execute;
   wherein the target address space is configured to execute the executable module from the shared memory segment;
   wherein the target address space uses an asynchronous exit routine to execute the executable module;

wherein a cross-memory post is sent by the target address space to the home address to signal completion of the executable module.

\* \* \* \* \*